United States Patent [19]

Sakurai et al.

[11] 4,422,572
[45] Dec. 27, 1983

[54] ENGINE COOLING WATER CIRCULATION SYSTEM

[75] Inventors: Yukio Sakurai, Atsugi; Masao Okajima, Yamato; Arifumi Inoue, Yokohama, all of Japan

[73] Assignee: Nissan Motor Co., Ltd., Yokohama, Japan

[21] Appl. No.: 327,489

[22] Filed: Dec. 4, 1981

[30] Foreign Application Priority Data

Dec. 22, 1980 [JP] Japan .................. 55-184600[U]

[51] Int. Cl.³ ............................................. B60H 1/02
[52] U.S. Cl. ........................... 237/12.3 B; 98/2.05; 237/12.3 A
[58] Field of Search ............... 237/12.3 A, 12.3 B, 237/12.3 C; 165/47; 98/2.05

[56] References Cited

FOREIGN PATENT DOCUMENTS

| | | | |
|---|---|---|---|
| 271298 | 5/1927 | United Kingdom | 237/12.3 B |
| 1157265 | 7/1969 | United Kingdom | |
| 1170096 | 11/1969 | United Kingdom | |
| 1358102 | 6/1974 | United Kingdom | |

*Primary Examiner*—Albert J. Makay
*Assistant Examiner*—Henry Bennett

[57] ABSTRACT

In an engine cooling water circulation system which comprises a radiator, a water jacket of the engine, a first hose feeding a cooled water from the radiator to the engine water jacket, a second hose feeding a heated water from the engine water jacket to the radiator, a heater core of a passenger room heater, a third hose leading from the engine water jacket to a lower portion of the heater core for feeding the heated water from the engine water jacket to the heater core; and a fourth hose leading from an upper portion of the heater core to the first hose for feeding the cooled water from the heater core to the first hose, there is provided a two-way valve which is disposed in the fourth hose at a portion near the upper portion of the heater core. The two-way valve has a condition wherein the interior of the heater core is communicated with the open air.

9 Claims, 8 Drawing Figures

ENGINE COOLING WATER CIRCULATION SYSTEM

BACKGROUND OF THE INVENTION

1. Field of the Invention

The present invention relates in general to an engine cooling water circulation system, and more particularly to an engine cooling water circulation system which is constructed to facilitate water charging thereinto.

2. Description of the Prior Art

Some modernized motor vehicles have a very slanted engine room hood causing the front of the engine room to have a limited space. In this type engine room, the arrangement of the engine cooling water circulation system is inevitably so made that a radiator is positioned at generally the same level as the remaining parts of the system, so that water charging to such system takes a relatively long time because of lack of sufficient water head in the system during the charging. This undesired phenomenon becomes more critical when the system has therein a closed loop circuit such as a heater system which comprises a heater core for a passenger room heater, a water inlet hose leading from the engine water jacket to a lower portion of the heater core and a water outlet hose leading from an upper portion of the heater core to a part of the system which part is positioned lower than the portion where the water inlet hose is connected to the engine water jacket. In fact, during the water charging, a "sealed" air chamber remains in the heater core thus disturbing the smooth water charging in the system.

SUMMARY OF THE INVENTION

Therefore, it is an object of the present invention to provide an improved engine cooling water circulation system which is free of the above-mentioned drawbacks.

According to the present invention, there is provided an engine cooling water circulation system for an engine having a water jacket therein. The system comprises a radiator having a water inlet thereon, a first hose for feeding a cooled water from the radiator to the engine water jacket, a second hose for feeding a heated water from the engine water jacket to the radiator, a heater core of a passenger room heater, a third hose leading from the engine water jacket to a lower portion of the heater core for feeding the heated water from the engine water jacket to the heater core, a fourth hose leading from an upper portion of the heater core to the first hose for feeding the cooled water from the heater core to the first hose, the lower portion being positioned at a lower level than the upper portion, and valve means disposed in the fourth hose at a portion near the upper portion of the heater core, the valve means being capable of providing a communication between the interior of the heater core and the open air under a certain condition.

BRIEF DESCRIPTION OF THE DRAWINGS

Other objects and advantages of the present invention will become clear from the following description when taken in conjunction with the accompanying drawings, in which.

DESCRIPTION OF THE INVENTION

Figure 1:
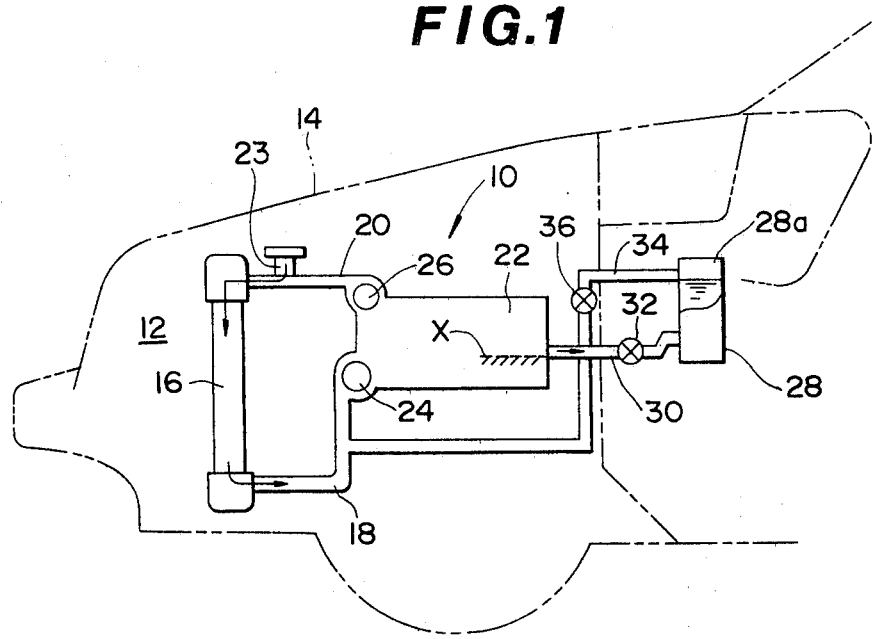
FIG. 1 is a schematic illustration of an engine cooling water circulation system of a first embodiment according to the present invention.

Referring to FIG. 1, there is shown a first embodiment of the present invention. The engine cooling water circulation system 10 of this embodiment is mounted in an engine room 12 of a modernized vehicle having a very slanted engine room hood 14. As has been described hereinbefore, the provision of such slanted engine room hood 14 has caused a difficulty in charging the system 10 with cooling water in a shortened time. However, by the measure of the present invention, such difficulty is solved as will become apparent as the description proceeds.

The engine cooling water circulation system 10 of the first embodiment comprises a radiator 16 which is connected through first and second hoses 18 and 20 with a water jacket 22 of an engine to form a so-called closed loop water circuit including the radiator 16 and the engine water jacket 22. A water inlet 23 is mounted on the second passage 20 through which water is poured into the radiator 16. A known water pump 24 is equipped in the circuit for driving the cooling water to circulate through the system 10. The circuit has a known thermostat 26 which keeps the second hose 20 open only when the temperature of the cooling water is above a predetermined level. Designated by numeral 28 is a heater core of a passenger room heater. A third hose 30 extends from the engine water jacket 22 to an inlet port (no numeral) of the heater core 28. A control valve 32 is disposed in the third hose 30, which is handled to open when heating the passenger room is required. A fourth hose 34 extends from an outlet port (no numeral) of the heater core 28 to a suitable portion of the first hose 18. For ease with which the following description is carried, the high-positioned part (which is shown horizontal in the drawing) of the fourth hose 34 is shown to have substantially the same height as the second hose 20. It is however to be noted that such positional relation between the second and fourth hoses 20 and 34 may be caused by the inherent construction of the vehicle having the very slanted engine room hood 14. A two-way valve 36 of which construction will be described hereinnext is disposed in the fourth hose 34 at a position near the outlet of the heater core 28. Preferably, the two-way valve 36 is positioned at the highest part of the fourth hose 34.

Figure 2:
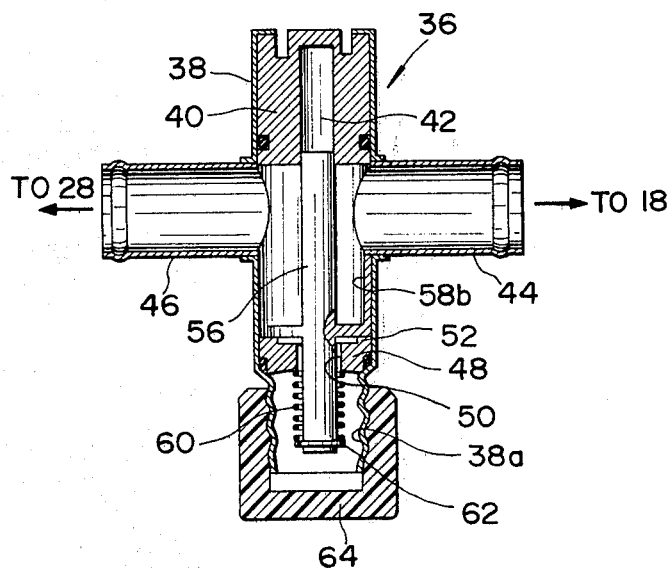
FIG. 2 is a sectional view of a two-way valve employed in the system of the first embodiment.
Figure 3:
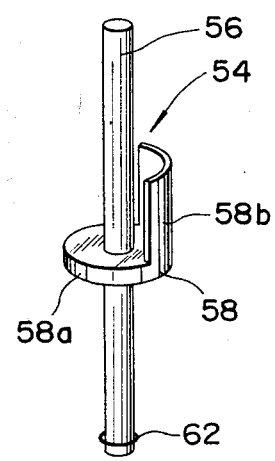
FIG. 3 is a perspective view of a piston-type valve body for the two-way valve of FIG. 2.

Referring to FIGS. 2 and 3, particularly FIG. 2, there is shown the detailed construction of the two-way valve 36. The valve 36 comprises a cylindrical housing 38 having one end plugged with a cylindrical body 40. For the purpose which will be described hereinafter, the body 40 is formed with a cylindrical blind hole 42. First and second pipes 44 and 46 are connected to the housing 38 to put therebetween the housing. As is indicated by the thick arrows in FIG. 2, the first pipe 44 is connected through a part of the fourth hose 34 to the first hose 18, while, the second pipe 46 is connected through the other part of the fourth hose to the heater core 28. A circular partition member 48 is disposed in the other portion of the cylindrical housing 38, the other portion of the housing 38 extending coaxially to form an externally threaded cover portion 38a. The partition member 48 is formed with a cylindrical through hole 50 which is coaxial with the above-mentioned blind hole 42. The partition member 48 is formed on its inside surface with an annular valve seat 52. A valve body 54 for the two-way valve 36 is clearly shown in FIG. 3. As shown, the valve body 54 is of a piston type which comprises a rod or stem 56 and a valve body proper 58. The valve body proper 58 includes a circular base portion 58a coaxially mounted on the generally middle section of the stem 56 and a semicylindrical portion 58b standing on the base portion 58a. The valve body 54 is axially movably disposed in the housing 38, having the upper and lower portions of the stem 56 received in the blind hole 42 of the plugging body 40 and the through hole 50 of the partition member 48, respectively as shown by FIG. 2. As is understood from this drawing, the sectional area of the through hole 50 is greater than that of the stem 56 thereby providing a certain clearance therebetween. The valve body 54 in the housing 38 is so orientated that the semicylindrical portion 58b blocks the passage of the first pipe 44 when the valve body 54 takes its uppermost position, and the circular base portion 58a is seated on the valve seat 52 to block the passage 50 of the partition member 48 when the valve body 54 takes its lowermost position. A coil spring 60 is disposed in the lower extending portion 38a of the housing 38 and compressed between the partition member 48 and a spring retainer 62 secured to the stem 56 so that the valve body 54 is biased to take the lowermost position. With the above, it will be appreciated that the two-way valve 36 takes a first condition (as shown in FIG. 2) to connect the first pipe 44 to the second pipe 46 when the valve body 54 is in the lowermost position, and a second condition to connect the second pipe 46 to the open air through the hole 50 of the partition member 48 when the valve body 54 is in the uppermost position. Screwed to the lower extending portion 38a of the housing 38 is a cap 64 which prevents the interior of the portion 38a from dust contamination.

When water charging to the system 10 is required, the control valve 32 for the passenger room heater is opened and the two-way valve 36 is handled to take the above-mentioned second condition. The cooling water poured through the water inlet 23 is first collected in the depth of the radiator 16 and then collected in the lower portions of the first and fourth passages 18 and 34 raising the water level therein. When the water level comes to the level indicated by reference X, the cooling water begins to flow into the heater core 28 through the third hose 30 and the open-conditioned control valve 32. Thus, after this, the cooling water is gradually collected in the heater core 28 reducing the volume of the air chamber 28a defined in the heater core 28 above the water level. If the air chamber 28a were hermetically sealed, the reduction of the air chamber volume would induce a pressure increase in the chamber thereby to disturb a smooth charging of water into the heater core 28. However, in the invention, with the two-way valve 36 assuming the second condition wherein the air chamber 28a communicates with the open air, the air in the air chamber 28a is discharged into the open air through the through hole 50 of the partition member 48 in accordance with raising of water level in the heater core 28. Thus, the charging of water into the heater core 28, that is, into the system 10 is smoothly made in a shortened time. When the air discharging is completed, the two-way valve 36 is handled to take the first condition wherein the first and second pipes 44 and 46 are communicated and the open air passage 50 of the partition member 48 is blocked. With this, the water charging to the system 10 is completed.

As may be understood from the construction of the two-way valve 36, providing the valve 36 with the second condition is made by removing the cap 64 and pushing the stem 56 upwardly with, for example, a finger of the operator's hand. In fact, it is necessary to hold the stem 42 in the uppermost position by the operator during the water charging procedure. As is known, this work is troublesome.

Figure 4:
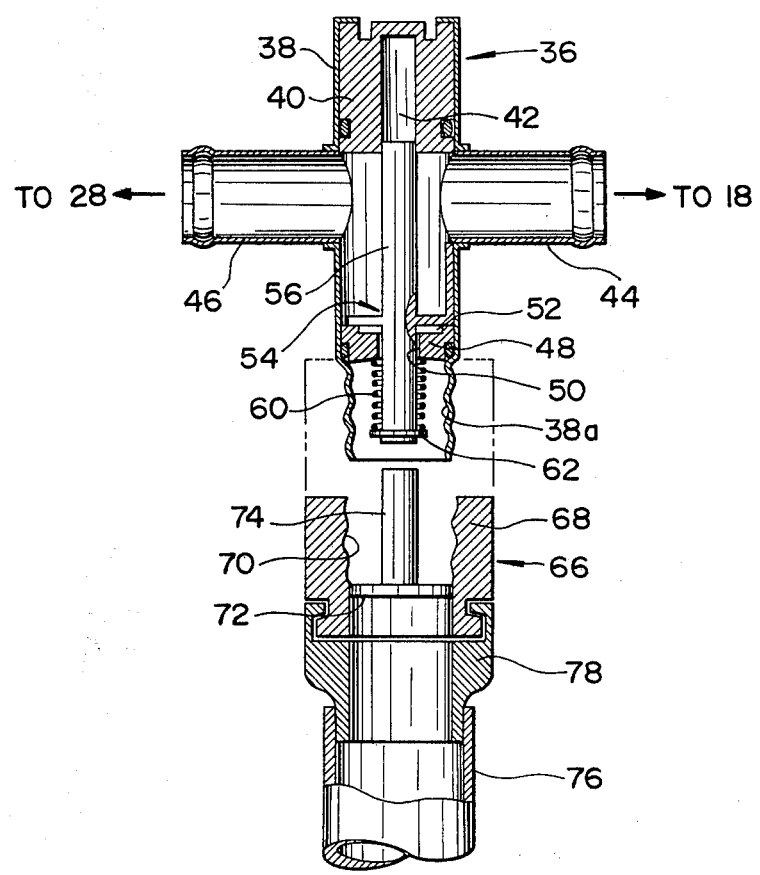
FIG. 4 shows sectional views of the two-way valve and an daptor for the valve.

FIG. 4 shows an adaptor which can solve the above-mentioned troublesome work. The adaptor 66 is designed to hold the two-way valve 36 in the second condition when it is coupled with the valve 36 in a manner as is shown by a phantom line. The adaptor 66 comprises a cylindrical body 68 having a threaded through hole 70. A cross bar 72 is secured to the wall of the hole 70 normally crossing the hole 70. A pushing rod 74 is secured to the bar 72 and extends therefrom to the mouth of the hole 70. Upon coupling the adaptor 68 with the lower extending portion 38a of the two-way valve 36, the rod 74 pushes the stem 56 upwardly and keeps the valve body 54 in its uppermost position thereby keeping the two-way valve 36 in the second condition. Upon disconnection of the adaptor 66 from the two-way valve 36, the valve body 54 returns to its lowermost position by the function of the spring 60 thereby keeping the two-way valve 36 in the first condition.

Preferably, the adaptor 66 is provided with a drain hose 76 which is connected to the adaptor 66 through a known connector 78. With the provision of the hose 76, the overflowing water through the passage 50 of the two-way valve 36 is prevented from scattering to the surrounding of the system 10.

Figure 5:
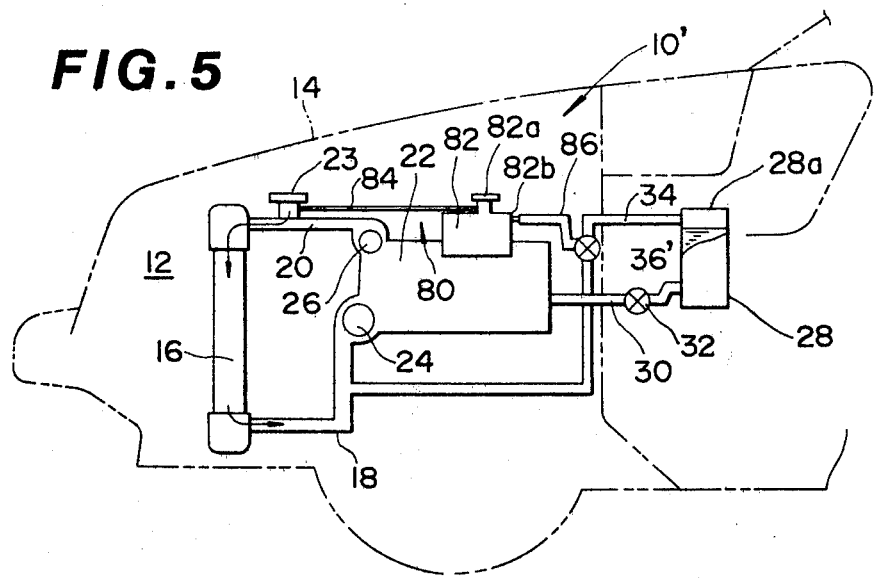
FIG. 5 is a view similar to FIG. 1, but showing a second embodiment of the present invention.

Referring to FIG. 5, there is shown a second embodiment of the present invention. Substantially the same parts as those of the first embodiment are designated by the same numerals and the detailed explanation on these parts will be omitted from the following.

The engine cooling water circulation system 10' of the second embodiment comprises generally the same parts as those of the first embodiment 10 except for several parts. In fact, an overflowing water collecting system 80 is employed in the second embodiment for collecting in a certain device the overflowing water from the heater core 28.

The overflowing water collecting system 80 comprises a reserve tank 82 located at a relatively high position in the engine room 12. Extending from the water inlet 23 of the radiator 16 to an upper portion 82a of the reverse tank 82 is a tube 84 through which overflowing water at the water inlet 23 flows into the reserve tank 82. A fifth hose 86 is connected at its one end to another upper portion 82b of the reserve tank 82 and at its other end to the fourth hose 34 through a two-way valve 36'. Preferably, the fifth hose 86 is constructed of a transparent material.

Figure 7A:
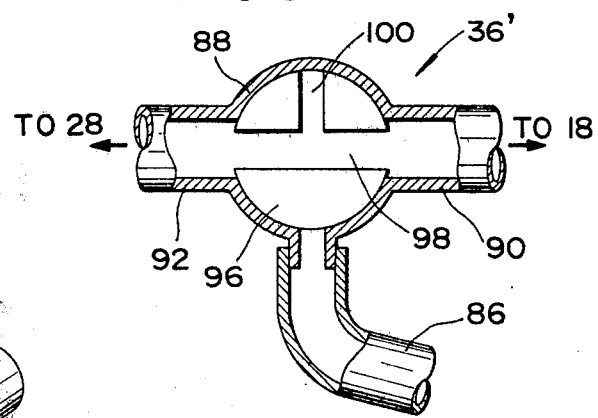
FIGS. 7A and 7B are sectional views of the two-way valve of FIG. 6, but showing two operative conditions respectively.
Figure 6:
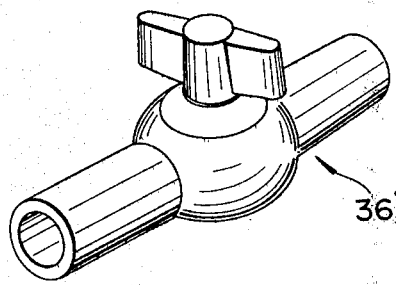
FIG. 6 is a perspective view of a two-way valve employed in the system of the second embodiment.
Figure 7B:
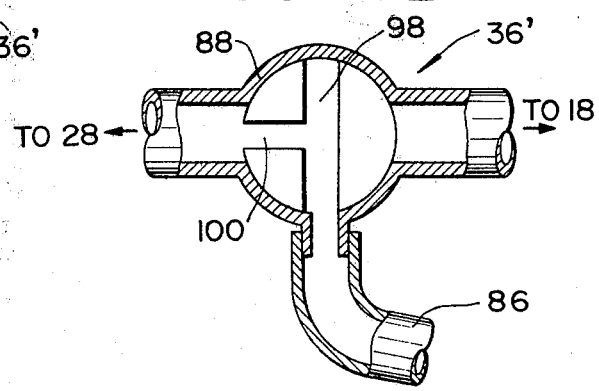

Referring to FIGS. 6, 7A and 7B, there is shown the detailed construction of the two-way valve 36'. The valve 36' comprises a housing having a spherical hollow portion 88 which is formed with first, second and third pipe sections 90, 92 and 94. The first pipe section 90 is connected through a part of the fourth hose 34 to the first hose 18, while, the second pipe section 92 is connected through the other part of the fourth hose 34 to the heater core 28, similar to the case of the first embodiment. The third pipe section 94 is connected to the fifth hose 86. A spherical valve body 96 having therein first and second passages 98 and 100 is sealingly and rotatably received in the spherical portion 88 of the housing. The two-way valve 36' takes both a first condition, as shown by FIG. 7A, wherein the first pipe section 90 is communicated with the second pipe section 92 through the first passage 98 of the valve body 96, and a second condition, as shown by FIG. 7B, wherein the second pipe section 92 is communicated with the third pipe section 94 which is connected through the fifth hose 86 to the reserve tank 82 the interior of which is exposed to the open air through an opening (not shown) formed in the upper portion of the tank 82.

When water charging to the system 10' is required, the control valve 32 for the passenger room heater is opened and the two-way valve 36' is handled to take the above-mentioned second condition (FIG. 7B). With the two-way valve 36' assuming the second condition, the air in the air chamber 28a of the heater core 28 is forced to discharge into the interior of the reserve tank 82 through the hose 86 in accordance with increase of water collected in the system 10'. When the heater core 28 is sufficiently filled with the cooling water, the water overflowing at the two-way valve 36' is compelled to flow into the reserve tank 82 through the fifth hose 86. Upon this condition, the two-way valve 36' is handled to take the first condition (FIG. 7A). With these operations, the water charging to the system 10' is completed.

As is understood from the foregoing description, in the invention, the water charging to the engine cooling water circulation system can be made smoothly in a shortened time by the provision of the two-way valve which can discharge air in the heater core into the open air.

Further, in the second embodiment, the overflowing water from the system is complelled to flow into the reserve tank thereby preventing the engine room from being contaminated with water.

What is claimed is:

1. An engine cooling water circulation system for an engine having a water jacket therein, comprising:
    a radiator having a water inlet thereon;
    a first hose for feeding cooled water from the radiator to the engine water jacket;
    a second hose for feeding heated water from the engine water jacket to said radiator;
    a heater core of a passenger room heater;
    a third hose leading from the engine water jacket to a lower portion of said heater core for feeding the heated water from said engine water jacket to said heater core;
    a fourth hose leading from an upper portion of said heater core to said first hose for feeding the cooled water from said heater core to said first hose, said lower portion being positioned at a lower level than said upper portion; and
    valve means disposed in said fourth hose at a portion near said upper portion of said heater core, said valve means being capable of providing a communication between said interior of said heater core and the open air under a certain condition,
    said valve means comprising a two-way valve which has first and second conditions, said first condition being a condition wherein the communication between the heater core and said first hose is established while blocking the communication between the interior of said heater core and the open air, and said second condition being a condition wherein the communication between the interior of said heater core and the open air is established while blocking the communication between the heater core and said first hose.

2. An engine cooling water circulation system as claimed in claim 1, in which said two-way valve comprises:
    a cylindrical housing having one end closed;
    first and second pipes connected to said housing in a manner to put therebetween said housing;
    a circular partition member disposed in the other end of said housing, said partition member being formed with an opening therethrough;
    a valve body including a stem, a circular base portion coaxially mounted on the generally middle section of said stem and a semicylindrical portion standing on said circular base portion, said valve body being axially movably received in said cylindrical housing with an end of said stem spacedly received in said opening of said partition member, said valve body in said housing having first and second positions, said first position being a position wherein said circular base portion closes the opening of said partition member and said semicylindrical portion opens the communication between said first and second pipes, and said second position being a position wherein said circular base portion opens the opening of said partition member and said semicylindrical member blocks the communication between said first and second pipes; and
    a spring for biasing said valve body to take said first position.

3. An engine cooling water circulation system as claimed in claim 2, further comprising protector means which includes:
    a cylindrical cover portion coaxially extending from the other end of said cylindrical housing to enclose the outwardly projected end portion of said stem; and
    a cap removably connected to said cover portion.

4. An engine cooling water circulation system as claimed in claim 3, further comprising an adaptor which holds said two-way valve in said second condition when coupled with said valve.

5. An engine cooling water circulation system as claimed in claim 4, in which said adaptor comprises:
    a cylindrical body having a through hole;
    a cross bar secured to the wall of said hole; and
    a pushing rod secured to said bar and extending therefrom to the mouth of said hole, whereby when said cylindrical body is coupled with the cylindrical cover portion of said housing, the pushing rod pushes the stem and keeps the valve body in said second position.

6. An engine cooling water circulation system as claimed in claim 5, further comprising a drain hose connected to said adaptor for carrying the overflowing water at said two-way valve to the outside of said system.

7. An engine cooling water circulation system as claimed in claim 1, in which said two-way valve comprises:
- a spherical hollow housing having first, second and third pipe sections;
- a spherical valve body having first and second passages therein and sealingly and rotatably received in said spherical hollow housing, said valve body in said housing having first and second positions, said first position being a position in which said first and second pipe sections are communicated through said first passage and the passage of said third pipe section is closed, and said second position being a position in which one of said first and second pipe sections is communicated with said third pipe section and the other of said first and second pipe sections is closed.

8. An engine cooling water circulation system as claimed in claim 7, further comprising fifth hose which leads from said third pipe section to a reserve tank to which a tube extending from said water inlet of said radiator is connected.

9. An engine cooling water circulation system for an engine having a water jacket therein, comprising:
- a radiator having a water inlet thereon:
- a first hose for feeding cooled water from the radiator to the engine water jacket;
- a second hose for feeding heated water from the engine water jacket to said radiator;
- a heater core of a passenger room heater, said core having at a lower portion thereof an inlet opening and at an upper portion thereof an outlet opening, said lower portion being positioned at a lower level than said upper portion when the engine cooling water circulation system is normally arranged, and said upper portion of said heater core being positioned at generally same level but lower than said water inlet of said radiator when said engine cooling water circulation system is normally arranged;
- a third hose leading from the engine water jacket to said inlet opening of said heater core for feeding the heated water from said engine water jacket to said heater core;
- a fourth hose leading from said outlet opening of said heater core to said first hose for feeding the cooled water from said heater core to said first hose; and
- valve means disposed in said fourth hose at a portion near said outlet opening of said heater core, said valve means being capable of providing a communication between the interior of said heater core and the open air under a certain condition.

* * * * *